Feb. 5, 1929.

W. L. SCHELLENBACH 1,701,275

LATHE MECHANISM

Filed Aug. 1, 1927

INVENTOR.

Feb. 5, 1929.

W. L. SCHELLENBACH 1,701,275

LATHE MECHANISM

Filed Aug. 1, 1927   6 Sheets-Sheet 4

INVENTOR.

Feb. 5, 1929.

W. L. SCHELLENBACH

LATHE MECHANISM

Filed Aug. 1, 1927     6 Sheets-Sheet 5

1,701,275

INVENTOR

Feb. 5, 1929.                      1,701,275
W. L. SCHELLENBACH
LATHE MECHANISM
Filed Aug. 1, 1927         6 Sheets-Sheet 6

INVENTOR.

Patented Feb. 5, 1929.

1,701,275

UNITED STATES PATENT OFFICE.

WILLIAM L. SCHELLENBACH, OF WYOMING, OHIO, ASSIGNOR TO THE AMERICAN TOOL WORKS COMPANY, OF CINCINNATI, OHIO, A CORPORATION OF OHIO.

LATHE MECHANISM.

Application filed August 1, 1927. Serial No. 209,980.

My invention relates to lathe mechanism adapted especially for repetitional work, and it is the object of my invention to provide new and improved means for feeding a tool or tools with relation to the work; further, to provide new and improved means whereby to feed a tool or tools into the work and return the same out of the work and to cause automatic cessation of movement of the tool or tools; further, to provide novel manual control means for initiating feeding movement of the tool or tools; further, to provide novel means for interrupting the power means for feeding the tool or tools upon completion of the cycle of operations upon the work; further, to provide novel means for maintaining such interruption and for feeding the tool or tools by hand; further, to provide novel means for controlling the rotation of the work; and, further, to provide novel means for automatically controlling the feeding movements of the tool or tools and the rotative movements of the work with relation to said feeding movements.

The invention will be further readily understood from the following description and claims, and from the drawings, in which latter:

The bed 21 supports a head-stock 22 and a tail-stock 23. The tail-stock is adjustable along suitable ways 24, and is clamped in adjusted positions by suitable clamps 25. The head-spindle 26 is journaled in suitable bearings in the head-stock. (See Fig. 4.) A drive-shaft 27 is also journaled in suitable bearings on the head-stock. Suitable speed changing gearing, shown generally at 28, may be located between the drive-shaft and the spindle for rotating the spindle at various speeds.

The means shown for rotating the drive-shaft is a pulley 31, which is rotatable loosely about the drive-shaft, and is arranged to be connected with the drive-shaft by means of a suitable clutch 32. (See Figs. 5 and 6.)

Figures 5, 6, 7:
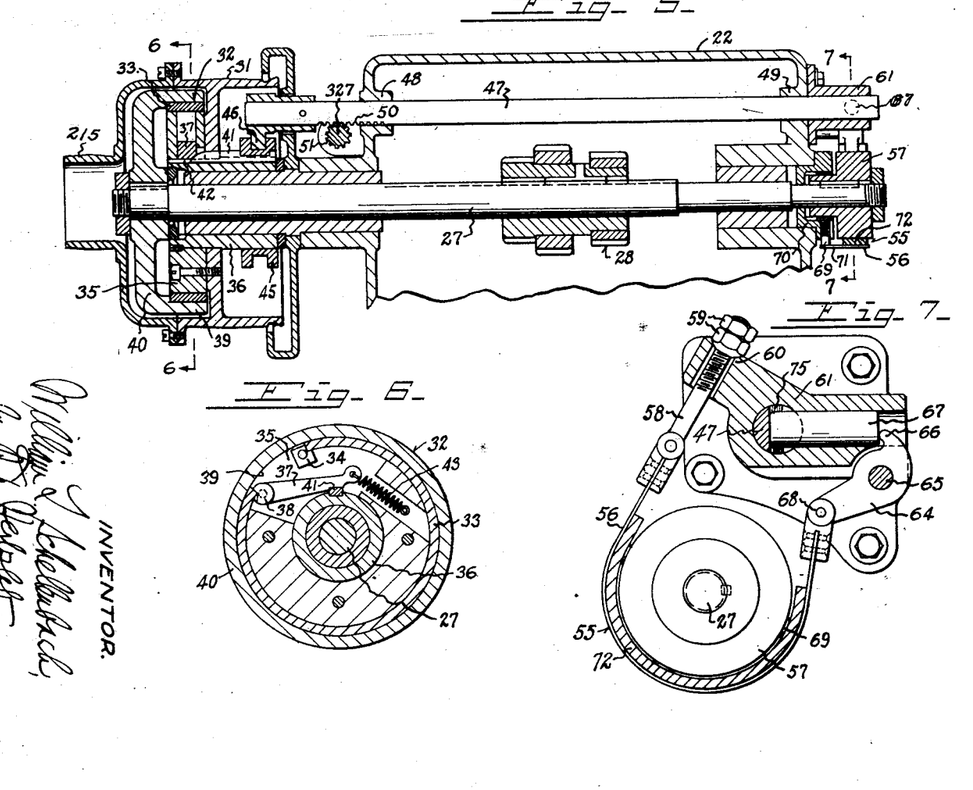
Fig. 5 is a vertical section of the same, taken in the plane of the line 5—5 of Fig. 4.
Fig. 6 is a cross-section of the same, taken in the plane of the line 6—6 of Fig. 5.
Fig. 7 is a cross-section of the same, taken in the plane of the line 7—7 of Fig. 5.

This clutch is exemplified as a friction clutch comprising a friction band 33. A stop 34 is on a hub 35 at one of the ends of the friction-band. The pulley is fixed to the hub and the hub is fixed to a pulley sleeve 36 rotatable with the pulley. An expanding lever 37 is pivoted at 38 to the hub, and coacts with the other end of the friction band, for expanding the friction band against the flange 39 of a cup 40 fixed to the drive-shaft 27. A cam-key 41 is slidable lengthwise in a groove 42 in the pulley sleeve 36 and is arranged to force the swinging end of the lever outwardly for engaging the clutch. The lever is normally retracted by a spring 43.

A spool 45 is fixed endwise to the cam-key and slides axially on the sleeve 36. A fork 46 is received in an annular groove in said spool and is fixed to an axially movable rod 47 slidable in bearings 48, 49, in the head-stock. The shaft is provided with a toothed rack 50, with which a pinion 51 meshes, operated in manner to be hereinafter described.

A brake, shown generally at 55, comprises a band 56 about a spool 57 fixed to the drive-shaft. (See Figs. 5 and 7.) The brake-band is fixed at one end to an adjustable threaded shank 58, adjustable by means of nuts 59 in a lug 60 of a bearing 61 fixed to the head-stock. A lever 64 is pivoted on a pin 65 extending from the head-stock and has a heel 66 engaged by a slide-pin 67. The other end of the lever is pivoted by a joint 68 with the other end of the brake-band. The brake-band is normally held away from the spool by means of spring-pressed plungers 69 in a fixed bearing-piece 70 attached to the head-stock, and acting on the brake-band to normally expand the same and release the spool. The spring-pressed plungers act on extensions 71 of the brake-band. The brake-band has a suitable lining 72 coacting with the spool.

The axially movable rod 47 is provided with a cam surface 75 which is arranged to push the slide-pin 67 outwardly for engaging the brake.

When the rod is moved in one direction the clutch is engaged and the brake released, and when it is moved in the opposite direction, the brake is engaged and the clutch is released, for either quickly starting or quickly stopping the drive-shaft 27.

Figure 3:
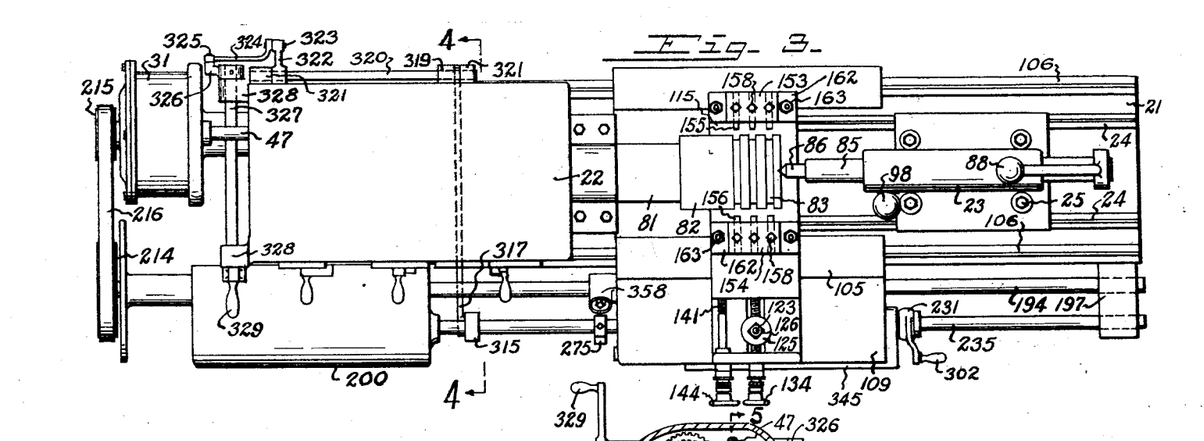
Fig. 3 is a plan view of my improved device.

The head-spindle is provided with a suitable chuck 81, (see Figs. 1 and 3) by means of which the work, represented at 82, is arranged to be secured, for rotating the work with the spindle. The piece of work is exemplified as a piston of an internal combustion engine, the operation being performed on the piston being represented as the cutting of the grooves 83 in the piston for receiving the usual piston rings, three of these grooves being shown.

The tail-stock has a tail-spindle 85 therein, in the inner end of which there is a usual tail-center 86. The tail-spindle is slidable axially in a bearing 87 in the tail-stock, and has a handle 88 at its outer end by means of which the tail-spindle is moved manually axially. Suitable means are provided for preventing rotation of the tail-spindle. The tail-spindle is moved axially for reception of the tail-center in the work and for movement of the tail-center away from the work. The construction enables quick movement of the tail-spindle and provides a large gap between the chuck and the tail-center for quick and proper placement and removal of the work.

The tail-spindle is arranged to be clamped in coacting position with the work by clamp shoes 91, 92, movable axially in a bearing 93 extending crosswise of the tail-stock. (See Figs. 1, 3 and 10.) A rod 94 is received through coaxial bores in the shoes, and has a nut 95 adjustably threaded over one end thereof, engaging one end of the shoes. The other end of the rod is provided with a pivot-head 96. A fork 97 on a handle 98 is received about the pivot-head and pivoted thereto by a pin 99. The fork is provided with cam-faces 100 at the respective sides of the rod, engaging a washer 101 between the fork and the other end of the clamping shoes. Moving the handle 98 of the fork downwardly clamps the spindle.

A carriage 105 is slidable lengthwise of the bed on guideways 106 on the bed, and is movable by a pinion 107 on a shaft 108 journaled in the apron 109 depending from the carriage, the pinion meshing with a rack 110 extending lengthwise of and secured to the bed. The shaft is provided with a squared end 111 for receiving a suitable operating handle.

A cross-slide 115 is slidable crosswise on guideways 116 on the carriage. (See Figs. 1, 3 and 8.) An auxiliary cross-slide 117 is slidable crosswise of the carriage on the main cross-slide 115 along guideways 118 between the main cross-slide and the auxiliary cross-slide.

A cam-block 121 is provided with a nut 122, which has a threaded stud 123 at its upper end. The cam-block is provided with shoulders 124 which coact with the main cross-slide. A washer 125 and nut 126 are received over the threaded stud 123 for clamping the nut to the main cross-slide.

A screw-rod 131 is threaded in the nut and is journaled in bearings 132, 133, in the main cross-slide. The screw-rod has a hand-wheel 134 thereon, by means of which it is turned in the nut for moving the screw lengthwise of the cam-block and determining the position of the main cross-slide with relation to the cam-block. A clamp-nut 135 is received about a threaded portion 136 of the screw-rod for clamping the screw-rod in adjusted positions to the bearing 132.

A screw-rod 141 is journaled in a bearing 142 on the main cross-slide, and is threaded into a threaded socket 143 in the auxiliary cross-slide. The screw-rod 141 is provided with a hand-wheel 144 for turning the same and thereby adjusting the position of the auxiliary cross-slide lengthwise of the main cross-slide and crosswise of the carriage. A clamping nut 145 is threaded over a threaded portion 146 of the screw-rod 141 and clamps the screw-rod in adjusted positions to the bearing 142.

The main cross-slide is provided with a tool-pedestal 151 and the auxiliary cross-slide is provided with a tool-pedestal 152. Tool-blocks 153, 154, are secured to the respective pedestals, and are respectively provided with cutting tools 155, 156, which are adjustably secured in the tool-blocks. The cutting edges of the respective tools are presented in opposite directions to the rotating work for proper cutting relation with the work. Three of each of the tools are exemplified for simultaneously cutting three annular grooves for piston rings in the piston-blank represented as the piece of work. The tools 155 are exemplified as roughing tools and the tools 156 are represented as finishing tools. The respective tools are received in slots 157 in the respective tool-blocks, and are clamped in adjusted positions by set-bolts 158.

The tool-blocks are laterally adjustable on the cross-slide, the pedestals of which are provided with T-slots 159, in which guiding lugs 160 of the tool-blocks are received. Bolts 161 are received in the T-slots and pass through lugs 162 in the tool-blocks, nuts 163 clamping the tool-blocks in adjusted positions on the tool-pedestals.

The oppositely presented cutting edges of the cutting tools are normally out of contact with the work. The cross-slides are moved crosswise of the carriage for first engaging the roughing tools with the work and rough-cutting the ring grooves in the piston, the cross-slides being then moved in opposite direction, whereby the roughing tools are moved out of the grooves and the finishing tools are moved into the grooves for finishing the cutting of the same to proper depth, the cross-slides being then moved in the first-named direction, and stopping preferably when the cutting edges of the respective tools are substantially equidistant from the work, at which point the cross-movement of the tools is arrested.

These various movements are preferably automatically performed. The relative adjustment between the tool-slides, and the adjustment of the cam-block on the main cross-slide, determine the distance between the tool-pedestals and the relations of the respective tool-pedestals to the vertical plane in which the axis of rotation of the head-spindle is located.

The means for operating the tool-slides is exemplified as a cam wheel 167, which is provided with a peripheral cam-rib 168 on its outer periphery. Rollers 169, 170, journaled on pins 171, 172, secured in the cam-block, engage the respective edges of the cam-rib for transferring the rotary movement of the cam into cross-movements of the tool-slides.

The cam-wheel is fixed to a shaft 181, journaled in bearings 182, 183, in the apron of the carriage. The cam-wheel is fixed to the shaft, as by a key 184, and a nut 185 threaded over the threaded portion 186 of said shaft. The shaft is held endwise between a shoulder 187 at its outer end and the outer end of the hub of the cam-wheel.

Figure 11:
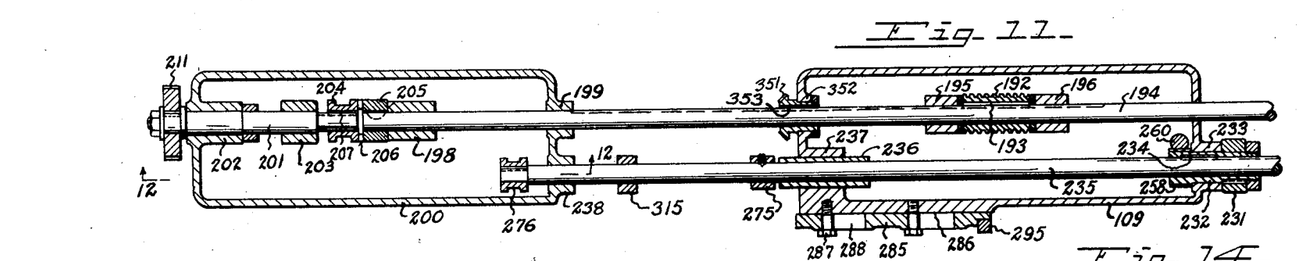
Fig. 11 is a horizontal section of my improved device, taken on the line 11—11 of Fig. 1, and partly broken away.

A worm-wheel 191 is fixed to the cam-wheel, and is meshed by a worm 192, which has spline groove and key connection 193 with a longitudinal shaft 194, extending longitudinally of the bed. (See Figs. 8 and 11.) Bearings 195, 196, extend from the apron of the carriage at the respective ends of the worm for moving the worm lengthwise of the shaft 194 upon movement of the carriage lengthwise of the bed. The shaft 194 is journaled in a bearing 197 at one end of the bed and in bearings 198, 199, on a clutch-housing 200, secured to the bed at the other end of the bed. A coaxial shaft 201 is journaled in bearings 202, 203, in the clutch-housing. The proximate ends of these coaxial shafts have the respective members 204, 205, of a clutch 206 thereon. The member 205 is fixed to the shaft 194 and the member 204 is a clutch-collar which has spline groove and key connection 207 with the shaft 201.

Figure 12:
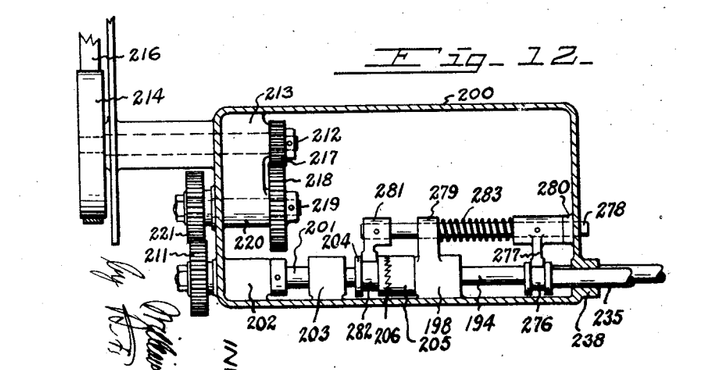
Fig. 12 is a vertical section, taken in the plane of the line 12—12 of Fig. 11, and partly broken away, showing a detail of the power interrupting means.

The shaft 201 has a gear 211 fixed thereto. A shaft 212 is journaled in a bearing 213 in the clutch-housing, and has a pulley 214 fixed thereto. (See Figs. 1, 11 and 12.) The pulley 31 has a pulley 215 fixed thereto. A belt 216 is received about these pulleys for driving the shaft 212. A gear 217 is fixed to the shaft 212, and meshes with a gear 218 fixed to a shaft 219 journaled in a bearing 220 in the clutch-housing. A gear 221 is fixed to the shaft 219 and meshes with the gear 211.

Automatic means are provided for stopping rotation of the work upon completion of the cutting movements of the cutting tools and prior to withdrawal of the finishing tools from the work, in order that, upon such withdrawal, the lateral walls of the grooves may not be defaced by spiral lines, which is the usual result when withdrawing tools during the rotation of the work. Automatic means are further provided for withdrawing the finishing tools after such stoppage of rotation of the work, so as to return the cutting tools to normal positions. The cessation of feeding movements of the tools upon their arrival in neutral positions is effected by the release of power interrupting means in the feeding train, instanced as the clutch 206.

Arms 225, 226, are fixed to rotate with the cam wheel, being fixed to the shaft 181.

Figure 1:
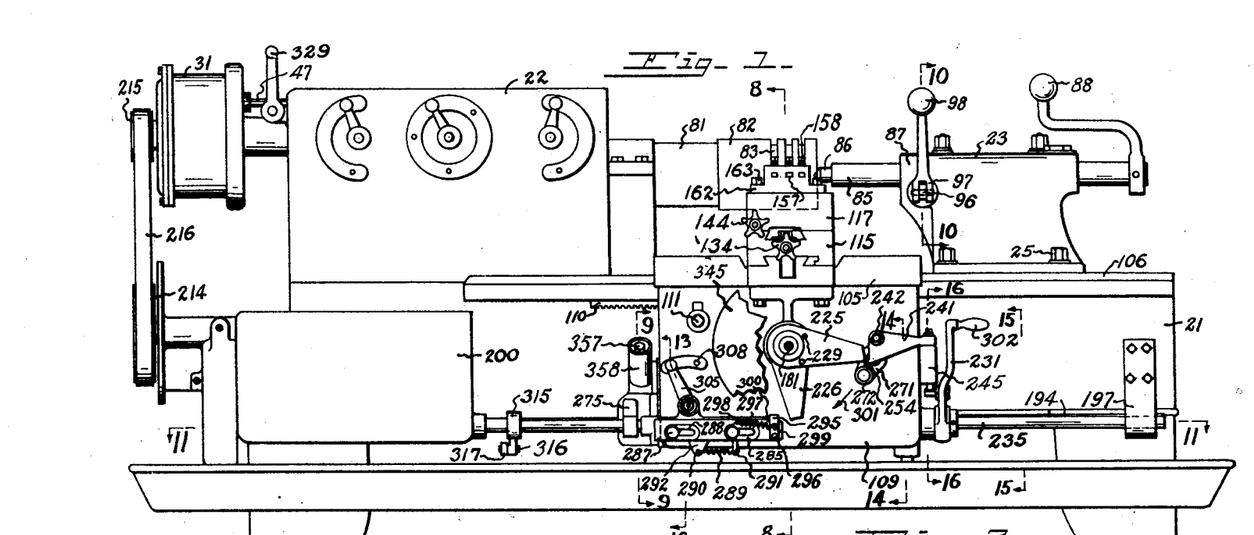
Fig. 1 is a front elevation of my improved device, partly broken away, and with the protective housing on the apron and the indicating means thereon removed.
Figures 8, 9, 10:
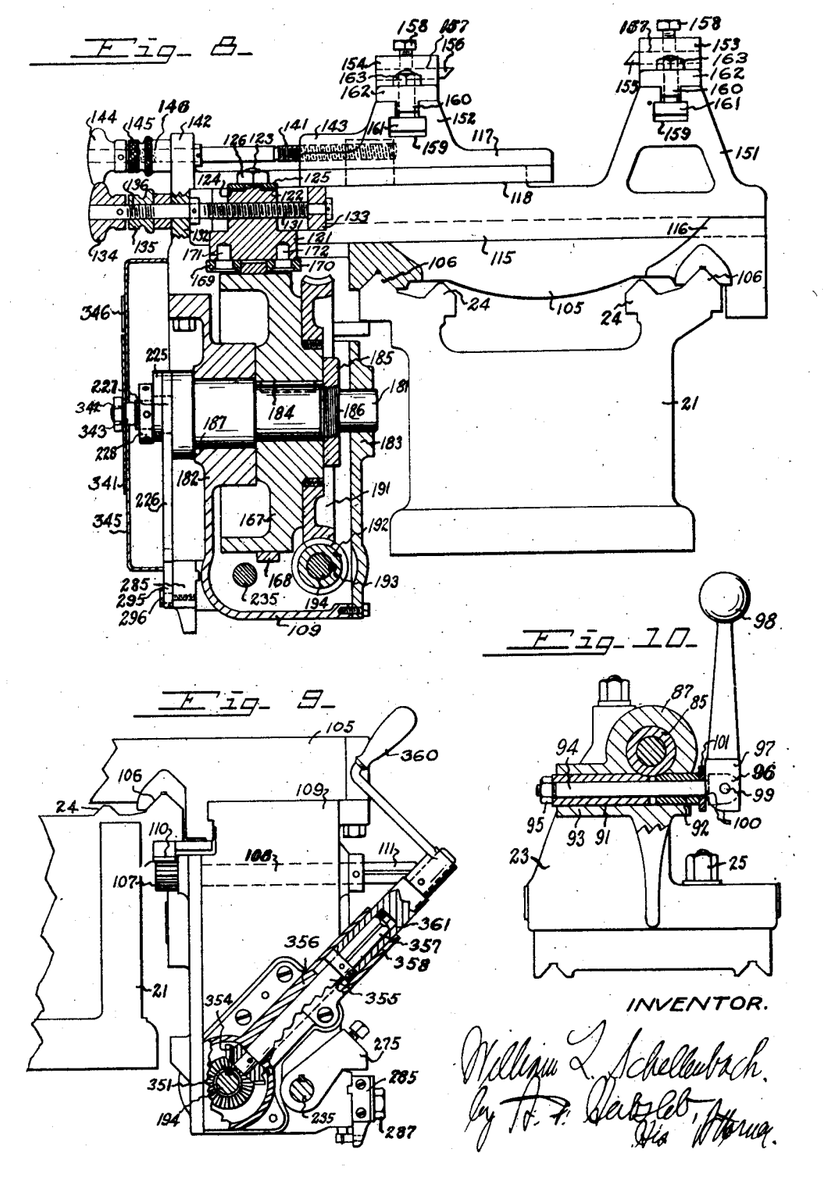
Fig. 8 is a vertical cross-section of my improved device, taken on the line 8—8 of Fig. 1.
Fig. 9 is a front end elevational detail view of the same, partly broken away and partly in section on the line 9—9 of Fig. 1.
Fig. 10 is a cross-sectional detail view, taken on the line 10—10 of Fig. 1, showing the clamping means for the sleeve of the tail-spindle.

(See Figs. 1 and 8.) The inner ends of the arms are provided with apertures received over a stud 227 extending from the shaft 181, the stud having a threaded end, over which a nut 228 is threaded for clamping the arms to said shaft. Pins 229 may also be received through mating holes in said arms and in said shaft for angularly positioning the arms.

A manual control-arm 231 is fixed to a sleeve 232, journaled in a bearing 233 in the apron. The sleeve has spline groove and key connection 234 with a control-shaft 235. This control shaft is rotatable and slidable axially in a sleeve 236 in a bearing 237 in the apron and in a bearing 238 in the clutch-housing.

A lever 241 is pivoted on a bolt 242 fixed to the apron, and is provided with a bearing 243 received about a latch-rod 244, slidable axially in a bearing 245 on the apron, and having a latch 246 coacting with a shoulder 247 on a pin 248 fixed in a bearing 249 on the control-arm 231. (See Figs. 1, 15 and 16.) A spring 251 surrounding the latch-rod normally urges engagement of the latch with the control-arm. Nuts 252, 253, on the threaded end of the latch-rod adjust the latching engagement between the latch and the control-arm. The bearing 243 on the lever 241 normally rests on the bearing 245.

The lever 241 is provided with a lug 254 which is arranged to be engaged by the arm 225 for tripping the latch.

When the latch is tripped, the control-arm is moved for rocking the shaft 235. This movement may be accomplished by the over-weighted position of the control-arm for causing downward movement of the control-arm by gravity.

Figure 14:
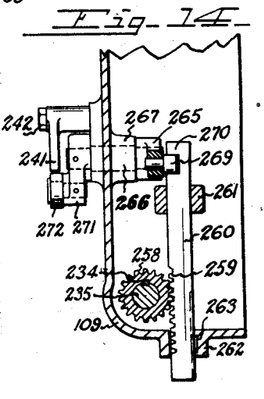
Fig. 14 is a cross-sectional detail view taken on the line 14—14 of Fig. 1, and partly broken away.

In order to insure such actuating movement of the control-arm, the sleeve 232 is provided with a pinion 258, which meshes with a rack 259 on an upright rod 260, slidable in bearings 261, 262, in the apron, and non-rotatively held therein by a key 263. (See Fig. 14.) A bell-crank lever comprises an arm 265 fixed to a rock-shaft 266 journaled in a bearing 267 in the apron. This arm carries a shoe 269 pivoted thereto, received in a cross-guide 270 in the rod 260 for reciprocating said rod. An arm 271 is fixed to the shaft 266 and has a roller 272 journaled thereon, which is arranged to be engaged by the arm 225 in the further movement of the latter arm after the latter arm has tripped the latch 246 for releasing the control arm 231. The movement of the bell-crank lever by the arm 225 causes the raising of the rod 260 and of the rack 259, and consequent rocking of the control-shaft 235.

The control-shaft has an arm 275 fixed thereto which, by the rocking of the control-shaft, is placed into interfering relation with means for axially moving the control-shaft.

The control-shaft is provided with a spool 276, in the annular groove of which a fork 277 is received. (See Figs. 11 and 12.) This fork is fixed to an axially movable rod 278, slidable axially in bearings 279, 280, in the clutch-housing. A fork 281 is fixed to this rod, and is received in an annular groove 282 in the clutch-collar 204, for disengaging the clutch, and thereby stopping rotation of the cam-wheel. The clutch-collar is normally urged into engaged relation with its mating clutch-member by a spring 283 about the rod 278 between the bearing 279 and the fork 277.

Automatic stoppage of such rotation is caused by the arm 226, the angular relation of which to the arm 225 is such that the clutch is disengaged immediately after the interfering position of the arm 275 is assumed, automatically stopping rotation of the cam-wheel at the completion of the cutting movements of the cutting tools.

A slide 285 is slidable on a guideway 286 on the apron, and is further guided by shoulder-bolts 287 received through slots 288 in the slide and threaded into the apron. (See Figs. 1 and 11.) The ends of the slots fix the limits of movements of the slide. The slide is normally held in retracted position by means of a spring 289, the respective ends of which are fixed to pins 290, 291, respectively in a lug 292 on the slide and in the apron. The slide is provided with a contact-arm 295, pivoted to the slide on a shoulder-bolt 296, received through said arm and threaded in the slide. A spring 297, the respective ends of which are received about pins 298, 299, respectively on the slide and said contact-arm, normally urges the contact-arm against a shoulder 300 on said slide.

The arm 226 is arranged to engage the contact-arm when moving in normal direction indicated by the arrow 301, for moving the slide endwise, and thereby contacting the interference arm 275 and moving the control-shaft 235 endwise. The annular path of the outer end of the arm 226 is within the annular path of the outer end of the arm 225, so that the arm 226 in rotating does not interfere with the latch-arm 271 or the roller 272.

When the control-arm has been tripped, and the movable member 204 of the clutch 206 has been moved into disengaged relation by the operation of the arms 225, 226, the feeding movements of the tool-slides are automatically arrested in positions with the tools away from the piece of work, so that the piece of work may be quickly removed and another piece inserted, fixed to the head-spindle, the rotation of the head-spindle being quickly stopped by release of the clutch 32 and engagement of the brake 55. The control-arm may be again quickly raised by manually raising the handle 302 thereof, for raising the interference arm 275, the interference arm being thereby raised above the slide 285. The spring 283, acting on the fork 277, retracts the control-shaft 235 axially and permits reengagement of the clutch 206, for again causing rotation of the cam-wheel 167, and initiating another cycle of operation on the work, which continues until the control-arm 231 is again automatically tripped. The slide 285 is retracted to normal position by means of the spring 289 as soon as the arm 226 has rotated beyond the range of the contact arm 295.

Figure 13:
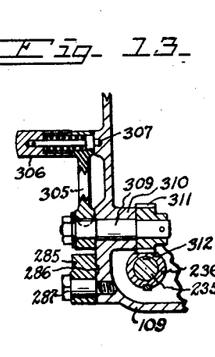
Fig. 13 is a cross-sectional detail view taken on the irregular line 13—13 of Fig. 1, and partly broken away.

Means are also provided for manually releasing the clutch 206 at any point of the operation of the machine. This is caused by an arm 305 having a pull-pin handle 306 thereon, the pin of which is arranged to engage holes 307, 308, respectively for release relation and engaged relation of the clutch 206. (See Figs. 1 and 13.) This control-arm is fixed to a shaft 309 journaled in a bearing 310 in the apron, and having a pinion 311 thereon, which meshes with a rack 312 on the sleeve 236. Movement of this arm to the right causes axial movement of the sleeve into engagement with the hub of the interference-arm 275 for moving the control-shaft 235 axially for disengaging the clutch 206. Movement of the interference-arm in the opposite direction permits reengagement of the clutch for operation of the feeding mechanism.

Means are provided for automatically causing cessation of rotation of the work preferably just prior to withdrawal of the finishing tools from the work, the movement of the finishing tools being momentarily stopped or caused to have a period of dwell just prior to such withdrawal. The means for automatically causing stoppage of rotation of the work is exemplified as connected with the rock-shaft 235, hereinbefore referred to as the control-shaft. (See Figs. 3 and 4.) This rock-shaft has an arm 315 fixed thereto which is articulated at 316 with a link 317, extending crosswise of the lathe bed. The link 317 has an articulation 318 with an arm 319 on a rock-shaft 320 journaled in bearings 321 at the rear portion of the lathe bed. This rock-shaft has an arm 322 fixed thereto. The arm 322 is articulated at 323 with a link 324 which is in turn articulated at 325 with an arm 326 fixed to a rock-shaft 327 journaled in bearings 328 in the head-stock. The rock-shaft 327 has the pinion 51 fixed thereto. When the control-arm 231 is tripped and moved for rocking the control-shaft 235, the pinion 51 is rotated for moving the axially slidable rod 47 lengthwise, to the right, as shown in Fig. 5, for releasing the clutch 32 and engaging the brake 55 and thereby causing quick cessation of rotation of the piece of work.

The rock-shaft 327 also has a handle 329 fixed thereto. (See Figs. 1, 3 and 4.) This handle forms an additional control-arm, so that the operator may set the machine in motion either by means of it or by means of the control-arm 231. The handle 329 may also be employed for momentarily engaging the clutch 32 for convenience in shifting the elements in the speed changing mechanism.

Figures 15, 16, 17, 18:
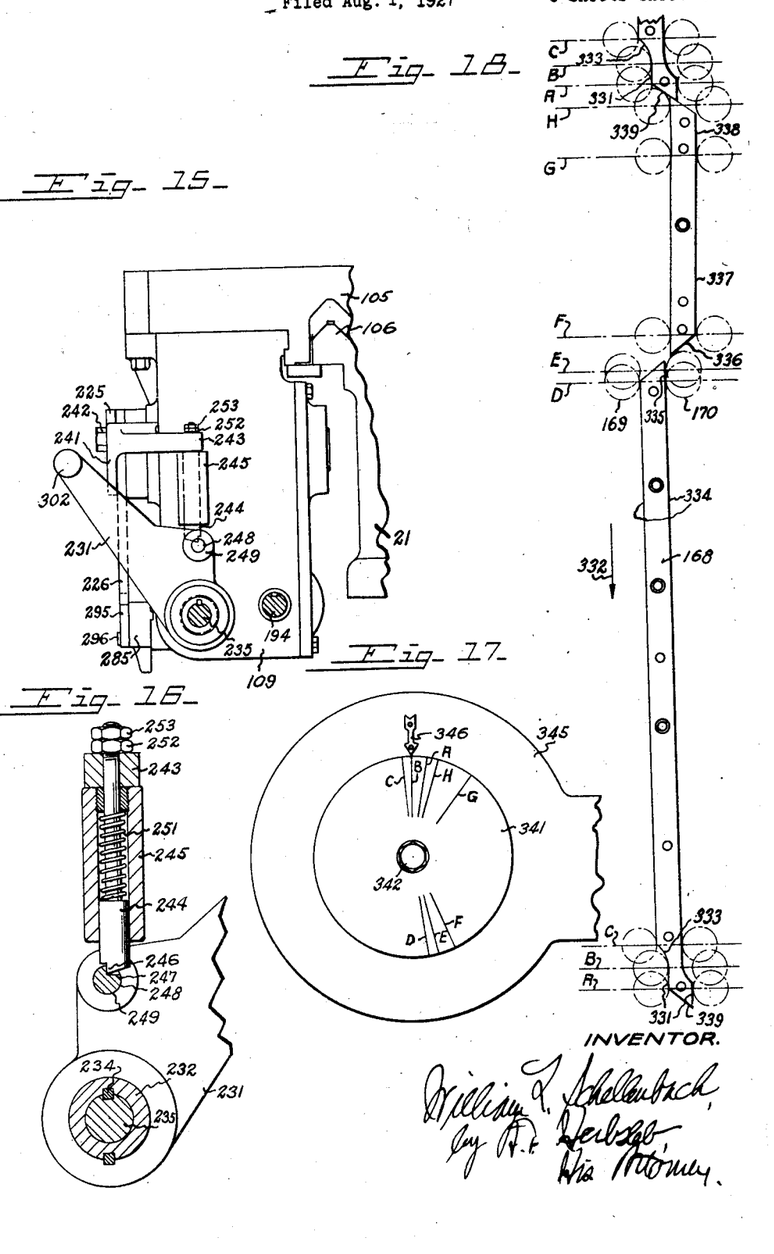
Fig. 15 is a vertical section, taken on the line 15—15 of Fig. 1, partly broken away.
Fig. 16 is a vertical sectional detail view, taken on the line 16—16 of Fig. 1, and partly broken away.
Fig. 17 is an enlarged detail view of the indicating means on the apron.
Fig. 18 is a diagrammatic view of the cam and its coactive rollers, laid out in plane.

Instancing the operation of the machine, and referring to the diagrammatic view in Fig. 18, of the cam 168 on the cam-wheel 167, and the coacting rollers 169, 170, the line A represents the relation of the axes of the rollers to the neutral faces 331 of the cam during a neutral position of the tools with relation to the work, in which both the roughing tools and the finishing tools are spaced from the outer periphery of the work. This is the point of the ending of a preceding cycle of movements of the tools and the work and the beginning of a new cycle of movements for the work and the tools.

When now the control-arm 231 is raised or the control-arm 329 is rocked, to shift the axially movable rod 47 for engagement of the drive clutch 32, rotation of the work is initiated. It will be understood that the drive pulley 31 is continuously rotating, and that its connection with the feed train is interrupted by the unclutched relation of the clutch 206. The rocking of the control-shaft 235 raises the interference-arm 275, whereby, by the urging of the spring 283, the clutch 206, is engaged, initiating rotation of the cam-wheel 167 and initiating the feeding movements of the tools.

The cam-wheel rotates in the direction of the arrow 332. There is a dwell of the tool-slides in neutral positions to enable the work to obtain a proper speed for cutting. This dwell takes place during rotation of the cam throughout an angle from the line A to the line B, at the beginning of an abruptly climbing portion 333 of the cam. When the rollers 169, 170, coact with this abruptly climbing portion, the tool-slides are shifted rapidly for moving the roughing tools rapidly toward the work into cutting position with relation to the work. The line B shows the relations of the centers of the rollers 169, 170, at the start of such rapid advance of the roughing tools toward the work, and the line C shows the relations of such centers to the cam at the end of such rapid advance of the roughing tools toward the work. The next portion 334 of the cam represents a gradual climb of the cam for gradual feeding of the roughing tools to the desired depth of the grooves to be cut in the work. The line C also represents the relation of the centers of said rollers to said cam at the start of such cutting movement of the rear or roughing tools, and the line D represents the relations of such centers to the cam at the end of the cutting movements of the rear or roughing tools, and at the start of a dwell of the rear cutting tools in the bottoms of the grooves. This dwell is represented by the angular portion 335 of the cam, in which the side faces of the cam are parallel with the path of the cam-wheel. Such dwell is sufficiently long to permit the work to have a few rotations imparted thereto by the rotating means so as to clean the grooves by means of the roughing tools. The dotted line E represents the relations of the centers of the rollers to said dwell portion of the cam at the end of the dwell of the rear or roughing tools in the work and at the start of the withdrawal of the rear or roughing tools. The withdrawal of the roughing tools is accomplished with a rapid movement. This movement also effects the rapid advance movement of the front or finishing tools toward the work into cutting position with relation to the work. This movement of the tools is accomplished by the abruptly inclined portion 336 of the cam.

The dotted line F represents the relation of the axes of the rollers 169, 170, to the cam at the end of such rapid advance of the finishing tools and at the start of the cutting movement of the finishing tools.

The rapid advances of the roughing tools and of the finishing tools to the work avoid time consumption in idle movements of the tools.

The gradually inclined portion 337 of the cam represents the feeding movement of the finishing tools during the cutting movement of the finishing tools in the work.

Figure 4:
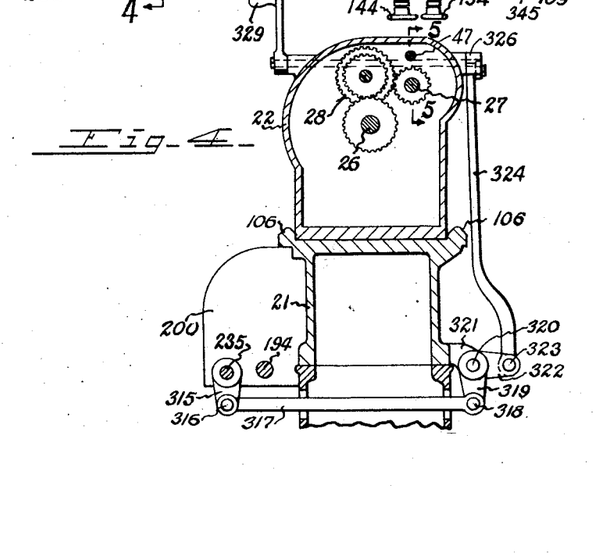
Fig. 4 is a vertical cross-section of the same, taken on the line 4—4 of Fig. 3, partly broken away, and showing the power controlling means.

The dotted line G represents the end of such cutting movement of the finishing tools and the start of a dwell of the finishing tools with relation to the work. This dwell of the finishing tools with relation to the work continues throughout the coaction of the rollers with the dwelling portion 338 of the cam, in which the side faces of the cam are parallel with the path of the cam. During the first portion of such dwelling position of the finishing tools in the work, the work is rotating a sufficient number of rotations to clean the grooves by means of the finishing tools. Rotation of the work is, however, caused to cease during such dwell of the finishing tools in the work, so that the tools may be withdrawn from the work while the work is at rest, so as to prevent the formation of spiral lines or tool marks and the marring of the finished surfaces in the grooves by the withdrawal of the tools during rotation of the work. The rotation of the work is caused to cease during such coaction of the rollers with this dwelling portion 338 of the cam, preferably prior to arrival of the point in the cam represented by the line H, in line with the axes of the rollers. The line H represents the end of the dwelling portion of the cam. Cessation of rotation of the work is caused for instance by coaction of the arm 225, rotating with the cam, with the latch 246 for releasing the control-arm 231, and the coaction of said arm 225 with the arm 271 for rocking the control-shaft 235, and thereby disengaging the driving clutch 32 and engaging the brake 55, through the medium of the links 317, 324 (Fig. 4).

Rotation of the cam continues. The line H represents the relations of the centers of the rollers 169, 170, to the cam at the end of such dwell of the finishing tools, and the start of the withdrawal of the finishing tools from the work, which occurs while the work is at rest, and which withdrawal returns the tools to neutral positions, this being accomplished by the abruptly inclined portion 339 of the cam. This withdrawal takes place during the angular travel of the cam from the line H to the line A, which latter represents the relations of the centers of the rollers to the cam at the end of the rapid return of the tools to neutral positions, at which point the rotation of the cam-wheel is stopped by the coaction of the arm 226, which rotates with the cam, with the slide 285, effecting disengagement of the clutch 206.

This completes the cycle of rotation of the work and the cycle of feeding movements of the tools and places the tools in neutral positions away from the work, the work having been stopped, so that the piece of work just finished can be unclutched and removed from the machine and a new piece of work inserted, which is rapidly accomplished, whereupon either of the control arms 231 or 329 may be moved, for again initiating the cycles of movements of the work and of the tools, for operation upon the newly inserted piece of work.

Figure 2:
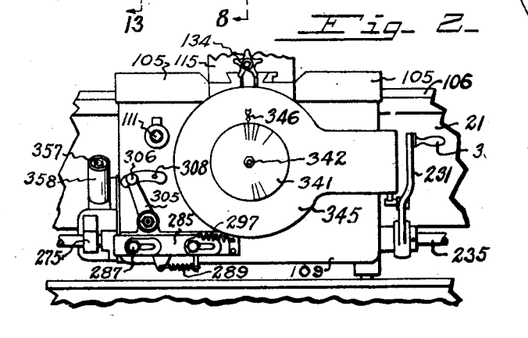
Fig. 2 is a front elevation of the apron and adjacent parts, partly broken away, showing the protective housing and the indicating means.

In order that the relations of the points in the cycles of operation may be conveniently observed by the operator, an indicator-plate 341 is provided, which rotates in unison with the cam-wheel. (See Figs. 2, 8 and 17.) It is shown fixed to the shaft 181 of the cam-wheel by means of a bolt 342, the angular relation of the indicator-plate to the cam-wheel being fixed, as by a key 343 between the indicator-plate and the shaft 181. The lines on the indicator-plate correspond to the lines imposed on the cam in Fig. 18, and are designated by similar reference letters. A cover 345 is fixed to the apron and protects the arms 225, 226, 241 and 271. This cover has a pointer 346 thereon with which the lines on the indicator-plate 341 register.

The lines on the indicator-plate may have suitable designations thereon to represent the steps in the cycles of operation upon arrival of such lines in registry with the pointer 346.

Means are also provided for feeding the tools manually, as by providing a bevel-pinion 351, which is journaled in a bearing 352 in the apron, and held axially therein. (See Figs. 1 and 9.) This bevel-pinion has spline groove and key connections 353 with the longitudinal feed-shaft 194. The bevel-pinion 351 meshes with a bevel-pinion 354, which is fixed to a shaft 355, journaled in a bearing 356 on the end of the apron. This shaft has a squared end 357, this squared end being located in the socket of a socket-piece 358 extending from the bearing 356, for protecting the outer end of the shaft 355 and preventing accidental contact therewith by the operator, as this shaft rotates during the automatic feeding movements of the cross-slides. A handle 360 is provided with a socket-end 361 received in the socket-piece 358 about the end of the shaft 355, for rotating the shaft. This handle may also be received about the outer end 111 of the pinion-shaft 108 for feeding the carriage lengthwise of the bed.

Repetitional work is rapidly and accurately performed by my improved device. The piston blanks may for instance be quickly secured to the drive-spindle. The control-arm 231 which is in convenient position for the operator standing in front of the machine, may be quickly raised for initiating the feeding movements of the cutters, which feeding movements are automatically arrested upon completion of the ring-grooves in the piston, the cutter slides moving in one direction for rough cutting the grooves, and in the opposite direction for finish cutting of the grooves, and again in the first-named direction for distancing the cutters from the piston, the limits of these movements being accurately determined and the feeding movements being automatically interrupted upon completion of the cutting. The rotation and cessation of rotation of the piece of work is also quickly effected. Interruption in the feeding train is also quickly manually accomplished at any point in the feeding movements.

Having thus fully described my invention, what I claim as new, and desire to secure by Letters Patent, is:

1. In a lathe of the character described, the combination of a work-rotating spindle, driving means, power interrupting means between said driving means and said spindle, braking means for said spindle, a cross-slide, tool-holders thereon at opposite sides of the axis of said spindle, said tool-holders arranged for receiving cutting tools at opposite sides of said axis of said spindle, a cam-wheel for feeding said cross-slide in opposite directions for combinedly feeding said tool-holders toward and from the axis of said spindle for alternate coaction of said cutting-tools with the work on said spindle, said cam provided with a portion locating the cutting-tool at one side of said work to fullest depth in said work and with a portion locating all said cutting-tools away from said work, automatic means automatically operating said power interrupting means and said braking means during coaction of said first-named portion of said cam with said cross-slide, and automatic means automatically arresting rotation of said cam-wheel during coaction of said last-named portion of said cam with said cross-slide.

2. In a lathe of the character described, the combination of a work-rotating spindle, driving means, power interrupting means between said driving means and said spindle, a cross-slide, tool-holders thereon at opposite sides of the axis of the spindle, said tool-holders arranged for receiving cutting-tools at opposite sides of the axis of said spindle, a cam-wheel for feeding said cross-slide in opposite directions for combinedly feeding said tool-holders toward and from the axis of said spindle for alternate coaction of said cutting tools with the work, said cam provided with a portion locating all said cutting tools away from said work, power interrupting means for said cam-wheel, automatic means automatically actuating said last-named interrupting means for arresting rotation of said cam-wheel during coaction of said last-named portion with said cross-slide, means whereby to interrupt said first-named power interrupting means, and manual means for reengaging said second-named power interrupting means.

3. In a lathe of the character described, the combination of a bed, a head-stock, a work rotating spindle therein, a carriage, an apron depending therefrom in front of said bed, a cross-slide on said carriage, tool-holders thereon at opposite sides of the axis of said spindle, said tool-holders arranged for receiving tools at opposite sides of said axis, a cam-wheel in said apron for feeding said cross-slide in opposite directions for combinedly feeding said tool-holders toward and from said axis for alternate coaction of said cutting tools with the work, said cam provided with a portion locating all said cutting-tools away from said work, power interrupting means for said cam-wheel, automatic means automatically actuating said last-named interrupting means for arresting rotation of said cam-wheel during coaction of said last-named portion with said cross-slide, and a handle reengaging said power interrupting means.

4. In a lathe of the character described, the combination of a bed, a head-stock, a work rotating spindle therein, a carriage, an apron depending therefrom in front of said bed, a cross-slide on said carriage, tool-holders thereon at opposite sides of the axis of said spindle, said tool-holders arranged for receiving tools at opposite sides of said axis, a cam-wheel in said apron for feeding said cross-slide in opposite directions for combinedly feeding said tool-holders toward and from said axis for alternate coaction of said cutting-tools with the work, said cam provided with a portion locating all said cutting-tools away from said work, power interrupting means for said cam-wheel, automatic means automatically actuating said last-named interrupting means for arresting rotation of said cam-wheel during coaction of said last-named portion with said cross-slide, and handles at opposite sides of the work-position for reengaging said power interrupting means.

5. In a lathe of the character described, the combination of a work rotating spindle, a tool-supporting cross-slide, feeding means for said cross-slide comprising a power interrupting means including a movable element, a manual control-arm, a latch therefor, means operated by said feeding means for automatically tripping said latch for movement of said control-arm, an interference part having operative connection with said control-arm and with said movable element, and means operated by said feeding means for moving said interference part whilst in such interfering relation and thereby moving said movable element for power interruption in said power interruption means, and constructed and arranged whereby manual return of said control arm retracts said interference part for reengagement of said power interrupting means.

6. In a lathe of the character described, the combination of a work rotating spindle, a tool supporting cross-slide, feeding means for said cross-slide comprising a power interrupting means including a movable element, a manual control-arm, a latch therefor, actuating means for said arm, said latch and said actuating means provided with contact-parts, an arm operated by said feeding means automatically coacting with said contact-parts for tripping said latch and moving said control-arm, an interference part having operative connection with said control-arm and with said movable element and moved into interference relation by said movement of said control-arm, and means operated by said feeding means for moving said interference part whilst in such interfering relation and thereby moving said movable element for power interruption in said power interrupting means, and constructed and arranged whereby manual return of said control-arm retracts said interference part for reengagement of said power interrupting means.

7. In a lathe of the character described, the combination of a work rotating spindle, a tool-supporting cross-slide, feeding means for said cross-slide comprising a power interrupting means including a movable element, a manual control-arm, a latch therefor, tripping means for said latch, actuating means for said arm, said tripping means and said actuating means provided with contact parts, an interference part having operative connection with said control-arm and with said movable element and moved into interfering relation by said actuating means, an actuating means for said interference part whilst in such interfering relation, and actuating means in train with said feeding means actuating said tripping means, said first-named actuating means and said second actuating means moving said movable element for power interruption in said power interrupting means for cessation of feeding movement of said feeding means, and constructed and arranged whereby manual return of said control-arm retracts said interference part for reengagement in said power interrupting means.

8. In a lathe of the character described, the combination of a work rotating spindle, a tool-supporting cross-slide, feeding means for said cross-slide comprising a power interrupting means including a movable element, a manual control-arm, an interference part having operative connection with said control arm and with said movable element, a pair of slides arranged for moving said interference part axially and thereby moving said movable element for power interruption in said power interrupting means, a part having operative connection with said feeding means for automatically moving one of said slides for such power interruption, and manual means having operative connection with the other of said slides for manually moving said interference part for such power interruption, and constructed and arranged whereby manual return of said control-arm places said interference part in non-interfering relation with said one of said slides.

9. In a lathe of the character described, the combination of a work rotating spindle, a tool supporting cross-slide, feeding means for said cross-slide comprising a cam-wheel, the cam whereof has operative connection with said cross-slide for feeding said cross-slide, a feed-shaft for said cam-wheel, means for driving said feed-shaft comprising power interrupting means including a movable element, an axially movable and rockable shaft having operative connection with said movable element, a manual control-arm for rocking said rock-shaft, an interference part rotatable with said rock-shaft, a slide for actuating said interference part, means for automatically moving said control-arm for interference relation of said interference part with said slide, and means operatively connected with said cam-wheel for operating said last-named means and said slide for automatic interruption in said power interrupting means, and constructed and arranged whereby retraction of said manual control-arm retracts said interference part out of range of said slide for reengagement in said power interrupting means.

10. In a lathe of the character described, the combination of a bed, a work rotating spindle, a carriage on said bed, an apron depending from said carriage, a tool supporting cross-slide on said carriage, means for reciprocating said cross-slide comprising a cam-wheel on said apron, the cam whereof has operative connection with said cross-slide for feeding said cross-slide, a feed-shaft for rotating said cam-wheel, means for driving said feed-shaft comprising power interrupting means including a movable element, an axially movable and rockable shaft on said apron having operative connection with said movable element, a manual control-arm at one end of said apron for rocking said rock-shaft, a latch on said apron normally holding said control-arm in retracted relation, an operating part on said apron for said control-arm, an interference part on said rock-shaft, a slide at the other end of said apron for actuating said interference part, and a plurality of arms between said latch, said operating part and said slide operatively connected with said cam-wheel for operating said latch, said operating part and said slide for automatic interruption in said power interrupting means, and constructed and arranged whereby retraction of said manual control-arm retracts said interference part out of range of said slide for reengagement in said power interrupting means.

11. In a lathe of the character described, the combination of a bed, a work rotating spindle, a carriage on said bed, an apron depending from said carriage, a tool supporting cross-slide on said carriage, means for reciprocating said cross-slide comprising a cam-wheel on said apron having operative connection with said cross-slide, a feed-shaft for rotating said cam-wheel, driving means therefor comprising a power interrupting means including a movable element, an axially movable and rockable shaft on said apron having operative connection with said movable element, an interference part on said last-named shaft, a slide on said apron arranged for moving said interference part, a manual control-arm having operative connections with said interference part, rotatable arms having operative connection with said cam-wheel automatically controlling said control-arm for interference relation of said interference part and automatically moving said slide for release relation of said movable element, and means normally urging return of said movable element into engaged relation, and constructed and arranged whereby retraction of said manual control-arm places said interference part in non-interfering relation with said slide for automatic reengagement in said interrupting means.

12. In a lathe of the character described, the combination of a bed, a work rotating spindle, a carriage on said bed, an apron depending from said carriage, a tool supporting cross-slide on said carriage, means for reciprocating said cross-slide comprising a cam-wheel on said apron having operative connection with said cross-slide, a feed-shaft for rotating said cam-wheel, driving means therefor comprising power interrupting means including a movable element, an axially movable and rockable shaft having operative connection with said movable element, an interference part on said last-named shaft, a slide on said apron arranged for moving said interference part, a manual control-arm having operative connection with said interference part, a latch on said apron normally holding said control-arm in retracted relation, latch operating means on said apron, and rotatable arms having operative connection with said cam-wheel automatically operating said latch for operation of said control-arm and for interference relation of said interference part and automatically moving said slide for release relation of said movable element, and means normally urging return of said movable element into engaged relation, and constructed and arranged whereby manual retraction of said manual control-arm places said interference part in non-interfering relation with said slide for automatic reengagement in said interrupting means.

13. In a lathe of the character described, the combination of a bed, a work supporting spindle, a carriage on said bed, an apron depending from said carriage in front of said bed, a tool supporting cross-slide on said carriage, feeding means for said cross-slide comprising a cam-wheel on said apron, a feed-shaft for rotating the same, power driving means comprising power interrupting means including a movable element for driving said feed-shaft, an axially movable rock-shaft journaled in said apron, an interference part thereon, a slide on said apron coacting with said interference part, means on said apron for rocking said interference part into interference relation with said slide, and rotary means having operative connection with said cam-wheel for operating said last-named means and said slide in sequence for moving said movable element into power interrupting relation for stopping the cross-feeding movement of said cross-slide.

14. In a lathe of the character described, the combination of a bed, a work supporting spindle, a carriage on said bed, an apron depending from said carriage in front of said bed, a tool supporting cross-slide on said carriage, feeding means for said cross-slide comprising a cam-wheel on said apron, a feed-shaft for rotating the same, power driving means comprising power interrupting means including a movable element for driving said feed-shaft, an axially movable rock-shaft journaled in said apron, an interference part thereon, a slide on said apron coacting with said interference part, rocking means on said apron for rocking said interference part into interference relation with said slide, rotary means having operative connection with said cam-wheel for operating said last-named means and said slide in sequence for moving said movable element into disengaged relation for stopping the cross-feeding movement of said cross-slide, and manual operating means on said apron for moving said rock-shaft axially for manual control of said interrupting means.

15. In a lathe of the character described, the combination of a bed, a work rotating spindle, a carriage on said bed, an apron depending from said carriage, a tool-supporting cross-slide, on said carriage, means for reciprocating said cross-slide comprising a cam-wheel on said apron, the cam whereof has operative connection with said cross-slide for feeding said cross-slide, means for rotating said cam-wheel comprising power interrupting means including a movable element, a manual control-arm at the end of said apron, an interference part having operative connection with said control-arm and with said movable element, a slide including a relatively movable contact-part arranged for moving said interference part axially when in such interfering relation and thereby moving said movable element for power interruption in said power interrupting means, a rotatable arm having operative connection with said cam-wheel for automatically moving said slide for such power interruption, and manual means for rotating said cam-wheel, said rotatable arm arranged to pass said relatively movable contact-part while said slide is maintained stationary during reverse rotation of said rotatable arm by said last-named manual means.

16. In a lathe of the character described, the combination of a work rotating spindle, a cross-slide arranged for receiving cutting tools at the respective sides of the axis of said spindle, means for rotating said spindle including power interrupting means, means for reciprocating said cross-slide comprising a cam-wheel provided with a cam, connecting means between said cam and said cross-slide, feeding means for said cam including power interrupting means, tripping means rotatable with said cam, and coacting means for said tripping means having operative connections with said two-named power interrupting means, and constructed and arranged for coacting with said two-named power interrupting means in the order named for sequentially causing stoppage of rotation of said spindle and of said cam-wheel.

17. In a lathe of the character described, the combination of a work rotating spindle, driving means, power interrupting means between said driving means and said spindle, a cross-slide arranged for receiving cutting tools at the respective sides of the axis of said spindle, a cam-wheel provided with a cam for reciprocating said cross-slide, feeding means for said cam-wheel including power interrupting means, tripping means rotatable with said cam-wheel, and coacting means therefor having operative connections with said respective power interrupting means, said tripping means coacting with said last-named coacting means sequentially with a time interval between such coactions for first causing cessation of rotation of said spindle and then causing reciprocation of said cross-slide for withdrawal of said tools from the work.

18. In a lathe of the character described, the combination of a work rotating spindle, driving means, power interrupting means between said driving means and said spindle, braking means for said spindle, a cross-slide arranged for receiving cutting tools at the respective sides of the work rotated by said spindle, a cam-wheel for said cross-slide for feeding said cross-slide in opposite directions for alternate coaction of said cutting tools with said work, said cam provided with a portion locating the tool at one side of said axis to greatest depth in the work and with a portion locating all said cutting tools away from said work, automatic means having operative connection with said power interrupting means and said braking means actuating said power interrupting means and causing braking action in said braking means during coaction of said first-named cam-portion with said cross-slide, and automatic means automatically arresting rotation of said cam-wheel during coaction of said last-named cam-portion with said cross-slide.

19. In a lathe of the character described, the combination of a work rotating spindle, driving means, power interrupting means between said driving means and said spindle, braking means for said spindle, a cross-slide arranged for receiving cutting tools at the respective sides of the work, a cam-wheel for feeding said cross-slide in opposite directions, said cam-wheel provided with cam portions coacting with said cross-slide respectively for neutral positions of said tools with relation to said work, for abrupt approach of said tool at one side of said work toward said work, for gradual entry of the cutting tool at said side into the work, for abrupt movements of said cross-slide in opposite directions for approach of the cutting tool at the opposite side of said axis to said work, for gradual entry of said last-named cutting tool into said work, for dwell of said last-named cutting tool in said work, and means operative during said last-named coaction for actuating said first-named power interrupting means and said braking means for stoppage of rotation of the work, said cam further provided with an abrupt cam-portion returning said tools to neutral positions.

In testimony whereof, I have hereunto signed my name.

WILLIAM L. SCHELLENBACH.